(12) United States Patent
Burgess et al.

(10) Patent No.: US 8,945,678 B2
(45) Date of Patent: Feb. 3, 2015

(54) SOFT BATT INSULATION MATERIAL AND METHOD FOR MAKING

(76) Inventors: Priscilla Burgess, San Francisco, CA (US); Joe Pozzi, Valley Ford, CA (US)

( * ) Notice: Subject to any disclaimer, the term of this patent is extended or adjusted under 35 U.S.C. 154(b) by 0 days.

(21) Appl. No.: 13/386,666

(22) PCT Filed: Jul. 23, 2010

(86) PCT No.: PCT/US2010/043100
§ 371 (c)(1),
(2), (4) Date: Jul. 3, 2013

(87) PCT Pub. No.: WO2011/011715
PCT Pub. Date: Jan. 27, 2011

(65) Prior Publication Data
US 2012/0164428 A1   Jun. 28, 2012

Related U.S. Application Data

(60) Provisional application No. 61/271,733, filed on Jul. 24, 2009.

(51) Int. Cl.
*B05D 3/02* (2006.01)
*E04B 1/88* (2006.01)
*B05D 1/18* (2006.01)
*E04B 1/74* (2006.01)

(52) U.S. Cl.
CPC ... *E04B 1/88* (2013.01); *B05D 1/18* (2013.01); *B05D 3/02* (2013.01); *E04B 2001/743* (2013.01)
USPC ..... 427/372.2; 427/384; 427/396; 427/430.1; 427/439; 427/443.2; 427/355

(58) Field of Classification Search
None
See application file for complete search history.

(56) References Cited

U.S. PATENT DOCUMENTS

| | | | | |
|---|---|---|---|---|
| 2,258,219 A | * | 10/1941 | Rochow | 428/390 |
| 2,693,432 A | * | 11/1954 | Fortess | 427/375 |
| 3,746,767 A | * | 7/1973 | Schwartz et al. | 514/642 |
| 4,678,822 A | * | 7/1987 | Lewellin | 524/12 |
| 5,741,379 A | * | 4/1998 | Tschernuth | 156/62.6 |
| 5,910,367 A | * | 6/1999 | Kean et al. | 428/393 |
| 2003/0176131 A1 | | 9/2003 | Tilton | |
| 2004/0132375 A1 | | 7/2004 | Fukuhara et al. | |

(Continued)

FOREIGN PATENT DOCUMENTS

| | | |
|---|---|---|
| EP | 0600843 A1 | 6/1994 |
| WO | 2008-012680 A3 | 1/2008 |

OTHER PUBLICATIONS

Registry file of RN 60207-90-1, propiconazole, entered STN Nov. 1984.*

(Continued)

*Primary Examiner* — Erma Cameron
(74) *Attorney, Agent, or Firm* — Dentons US LLP

(57) ABSTRACT

An article of manufacture and a method of manufacturing a soft batt insulation material. The article of manufacture comprises fibers having crimps and surface features such as scales that provide a batt structure which is resiliently compressible. Fiber treatments provide fire, pest, fungus, and mold resistance. The treatments can be to the surface or to the internal structure of the fiber. The insulation batts are comprised of one or more layers of intermeshed fibers. The fibers can be wool or other protein based hair. The batts can include a restrainment structure that limits that expansion of the batts.

21 Claims, 5 Drawing Sheets

(56) References Cited

U.S. PATENT DOCUMENTS

| | | | |
|---|---|---|---|
| 2005/0217537 A1* | 10/2005 | Knipe | 106/493 |
| 2006/0008496 A1* | 1/2006 | Kulkarni et al. | 424/412 |
| 2007/0006391 A1* | 1/2007 | Ghosh et al. | 8/115.51 |
| 2007/0078110 A1* | 4/2007 | Nishimoto et al. | 514/65 |
| 2007/0154505 A1* | 7/2007 | Manico et al. | 424/405 |

OTHER PUBLICATIONS

Bellwether Materials, Inc. et al., PCT/US2010/043100 filed Jul. 23, 2010, International Search Report and Written Opinion, ISA/KR, Apr. 15, 2011, 10 pages.

* cited by examiner

SOFT BATT INSULATION MATERIAL AND METHOD FOR MAKING

RELATED APPLICATIONS

This application is a National Stage Application under 35 USC 371 and claims priority to international application no. PCT/US2010/043100, filed 23 Jul. 2010, which claims priority to U.S. provisional patent application Ser. No. 61/271,733, filed 24 Jul. 2009, both of which are hereby incorporated by reference.

FIELD OF THE INVENTION

The present invention applies to the manufacture of a type of non-woven batt insulation used to insulate buildings, structures, and other areas where thermal or sound insulation is used. The insulation batts include the manufacture of batts using natural material, synthetic materials, or a combination thereof.

BACKGROUND

Insulation constitutes a very significant proportion of the volume of many buildings. The majority of this insulation comes in batt form—strips or blankets. Batt insulation comes in various widths and lengths and is packaged in rolls. This type of insulation is installed by cutting the un-rolled batts into the desired size, which is then pressed into spaces or cavities in walls, ceilings, attics, floors, etc. The most widely used forms of insulation are made from non-organic substances such as glass and minerals that are heated, spun and glued together to form batts. These insulating materials are known as fiberglass and mineral wool. There are numerous problems and limitation with these types of prior art insulation. First they require large amounts of energy to produce due to the materials from which they are manufactured. Secondly, the fiberglass or mineral wool insulation is stiffened and held together held with glues or binding agents that can emit harmful vapors to humans and the environment, and can increase the manufacturing cost. Further, small pieces of the insulation's non-organic fibers can break off and enter into human occupied environments and can cause adverse health conditions. And lastly, when removed from buildings the insulation material is not easily reused or recycled, does not biodegrade, and enters the waste stream.

Another limitation of prior art insulation is the compressibility of the material. Glass fibers can only be compress so much before they start breaking. Any glues or plastics used to give the batt its shape are broken down by compression such as by rolling the insulation material. Thus, a large amount of storage and transportation space is required for prior art bans.

Further, there are insulation batts manufactured from cellulous-based materials. The batts made from cellulous material such as cotton are use in combination with fixing or binding agents in the manufacture of the insulation. The fixing or binding agents can be latex, glues, or plastics, which are sprayed onto the material (in the case of latex and glues) and either air-dried or dried using ovens, or inter-woven with the material and heated to melt and bind with the organic material (in the case of plastics). The purpose of adding these substances into the manufacturing process is to give the finished product a resilient form. The added binders and fixing agents have environmental impacts. These include the release of harmful or irritating chemicals during manufacture and disposal of the insulation, increased energy required to manufacture the insulation, and increased cost of manufacturing.

In manufacturing these prior art batts, a significant amount of energy is needed to heat and/or dry the latex, plastic, or glue. Additionally, the creation and use of these fixer and binder substances further increases the energy expended for the manufacture of the insulation. Further, latex, plastics or glues can be toxic or can emit pollutants that are harmful to humans and the environment after installation.

During the installation process the insulation is cut to fit into the space requiring insulation. The addition of latex, plastic, or glue makes the insulation more rigid and thus less expandable or compactable and thus difficult to cut or stretch to fill gaps and therefore more difficult to install. Thus, for irregular areas or areas where the insulation has not been cut to the exact site needed, the rigid insulation will leave air pockets, gaps, or channels through which air currents flow allowing heat to enter or escape and thereby reduce the effectiveness of the insulation.

What is needed is an insulation material that is readily expandable to fill any voids being insulated, does not release harmful fibers during the installation or after being installed, requires less energy to manufacture than prior insulation material, does not use or release environmentally toxic materials while in use, during manufacturing, and after disposal, and is easier to store, transport, install, and recycle.

SUMMARY OF THE INVENTION

An insulation batt made from wool fibers, or other natural fibers makes better uses of a natural and renewable resource, is more environmentally safe, recyclable, and requires less energy to manufacture. Further, the wool insulation batt functions as a better insulator by having the characteristic of expanding to fill voids, is easier to install, store, transport, and does not release harmful chemicals or particles.

In a first aspect of the present invention, an insulation batt comprises protein-based fibers having crimps and irregularities along the fiber surface that impede the fibers from sliding over each other. The insulation batt is formed of one or more batt sheets of intermeshed fibers. The fibers at the interface between the layers of batt sheets are intermeshed sufficiently to hold the batt sheets together and thereby form an integral insulation batt.

In one embodiment, the protein-based fibers comprise of wool fibers that have crimps spaced of between $1/64$ and $1/4$ inches apart. The majority of fibers are between 20 and 40 microns in diameter, and $1/2$ inch to 6 inches in length. Wool from English Down sheep is exemplar of wool fibers having surface scales as irregularities, and crimps that provide the batt fibers the characteristic of interlocking and retain its shape after being compressed. These wool fibers are not usually used in the manufacture of clothing in that they are too coarse for fabric and can be itchy to the touch. A majority of the fibers have a resting length of one half to six inches in length. The fibers are process to form a sheet of intermeshed fibers with substantially uniform density.

In another embodiment, the batt comprises treated wool. The treatment is a flame retardant, a fungicide, a pesticide, or a combination of these chemicals. The treatment is applied such that when the batt is dried, the treatment is 0.2% to 15% of the batt weight. The treatment can be on the fiber surface or preferably is dispersed within the structure of the fiber.

In a further embodiment, a plurality of areas on the surface of the batt have the fibers push through the batt forming a restraining structure. Such fibers provide a restrainment structure for the batt in that these fibers intermesh with fibers of the adjacent sheets and limit or impedes the expansion of the batt.

The flame retardant can comprise mono-ammonium phosphate, di-ammonium phosphate, poly-ammonium phosphate, mono-ammonium sulfate, di-ammonium sulfate, poly-ammonium sulfate, guanyl urea phosphate or a combination of these chemicals mixed with either boric acid, disodium octaborate, boric acid with borates, or a combination thereof. The borates used, can be boric oxide, alkali earth, alkaline metal borates, disodium octaborate tetrahydrate, sodium pentaborate, calcium borates, zinc borates or a combination thereof. The pesticides can comprise permethrin, cypermethrin, deltamethrin, pyrethrod bifenthrin, fipronil, imidachlorprid, or a combination of these chemical. The fungicide can comprise tributyltin oxide, acypetacs-zinc, copper, iothiazolinones, quaternary ammonium compounds (such as didecyl dimethyl ammonium chloride (DDAC), azoles such as propiconazole, iodopropynyl-butylcarbamate (IPBC), chlorothalanil, or a combination of these chemicals.

In a second aspect of the present invention, a method of manufacturing an insulation batt comprising protein-based fibers. The protein-based fibers have crimps and surface irregularities that impede the fibers from sliding over the other fibers. The fibers can be wool having a diameter of between 20 and 40 microns and having crimps spaced between 1/64 of an inch and 1/4 inch apart.

In a step, the fibers are soaked in a treatment solution. The treatment solution can comprise a flame retardant, a pesticide, a fungicide, or a combination of these chemicals. The fibers are soaked for a period time sufficient for the treatment solution to enter into the internal structure of the fibers. For the fiber's internal structure to receive the best results, the fibers need to be soaked between three seconds and twenty minutes with a solution at 60 to 160 degrees Fahrenheit. For the best results, the dried fibers will contain between 0.2 and 15 percent of the treatment chemicals. The fibers used should be prewashed and free of lanoline, other oils, and other contaminants that could cause odors and prevent the treatment solution from penetrating into the fiber's internal structure.

The flame retardant component of the treatment solution can include mono-ammonium phosphate, di-ammonium phosphate, poly-ammonium phosphate, mono-ammonium sulfate, di-ammonium sulfate, poly-ammonium sulfate, guanyl urea phosphate, guanyl urea phosphate or a combination thereof, and boric acid, disodium octaborate, boric acid with borates, or a combination of these chemicals. The borates borates can include boric oxide, boric acid, alkali earth, alkaline metal borates, disodium octaborate tetrahydrate, sodium pentaborate, calcium borates, zinc borates or a combination of these chemicals. The pesticides can include permethrin, cypermethrin, deltamethrin, pyrethrod bifenthrin, fipronil, imidachlorprid, or a combination of these chemicals. The fungicide can include tributyltin oxide, acypetacs-zinc, copper, iothiazolinones, quaternary ammonium compounds (such as didecyl dimethyl ammonium chloride (DDAC), azoles such as propiconazole, iodopropynyl-butylcarbamate (IPBC), chlorothalanil, or a combination of these chemical.

In a step, the treated fibers are dried. Any conventional drying technique can be used including but not limited to heat dryers, spin dryers, air-drying, or any combination of these techniques.

In another step, the fibers are formed into a sheet of intermeshed fibers having a substantially uniform density. A carding process, a garnetting process, or both can be used to form a sheet of intermeshed fibers. Preferably, the density of the batt is between 1 and 3.0 pounds per cubic foot.

In a third aspect of the present invention, a method of manufacturing an insulation batt comprising protein-based fibers is disclosed. The fibers can be treated with a surface chemical to provide flame, fungus, mold, and pest resistance. The fibers can be treated before or after being formed into an intermeshed sheet of fibers with a substantially uniform density of between 1 and 3.0 pounds per cubic foot. The protein-based fibers can be wool fibers having crimps space between 1/64 and 1/4 inches apart.

In one embodiment, the fiber surfaces are treated with a bonding agent. The bonding agent includes an oil or other adhesive that will bind a treatment powder to the fibers. The oils can be natural or mineral oils.

In a further embodiment, the multiple sheets of intermeshed fiber are overlaid and pressed together either by passing the sheet between rollers or a pressure associated processes to provide interlocking of fibers at the interface between the sheets.

The fiber treatment can include a flame retardant, a pesticide, a fungicide, or a combination thereof. The flame retardant can be mono-ammonium phosphate, di-ammonium phosphate, poly-ammonium phosphate, mono-ammonium sulfate, di-ammonium sulfate, poly-ammonium sulfate, guanyl urea phosphate, guanyl urea phosphate or a combination of these chemicals. The fiber treatment can be further mixed with either boric acid, disodium octaborate, boric acid with borates, or a combination thereof. The borates can be boric oxide, alkali earth, alkaline metal borates, disodium octaborate tetrahydrate, sodium pentaborate, calcium borates, zinc borates or a combination thereof. The pesticides can be permethrin, cypermethrin, deltamethrin, pyrethrod bifenthrin, fipronil, imidachlorprid, or a combination of these chemical. The fungicide can comprise tributyltin oxide, acypetacs-zinc, copper, iothiazolinones, quaternary ammonium compounds (such as didecyl dimethyl ammonium chloride (DDAC), azoles such as propiconazole, iodopropynyl-butylcarbamate (IPBC), chlorothalanil, or a combination of these chemicals.

DETAILED DESCRIPTION

A. Fibers Used to Make the Soft Batts

The shape, surface characteristics, and method of processing the fibers provides the characteristics of an insulation material that holds form without the addition of glues or binding agents to hold the fibers together and an insulation material that is resiliently compressible.

Figure 1:
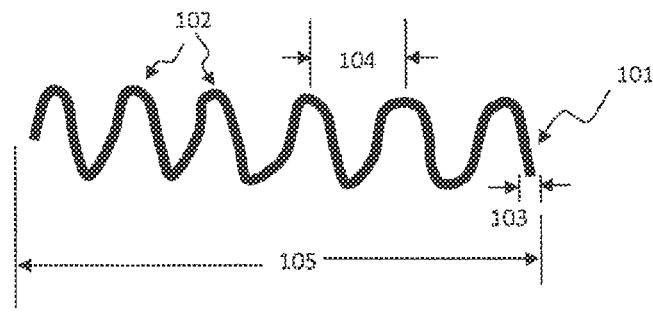
FIG. 1 is a side view of a fiber having crimps used in a batt with an intermeshed web of fibers.

FIG. 1 is a side view of an exemplar fiber 101 used to produce a batt of insulation material. The fiber can be from a natural source or synthesized from inorganic material. Exemplar of natural fibers includes but is not limited to protein-based fibers such as wool or cellulous-based fibers such as cotton. Exemplar of synthetic fibers includes but is not limited to fibers formed from plastics, polyesters, or other chemical petroleum based fibers, or fiberglass.

The average fiber diameter 103 used to produce an insulation batt is between twenty and forty microns. Preferably, the fiber length 105 resting is from one half inch to six inches for natural fibers and from one-half inch to twelve inches for synthetic fibers. For wool fibers, the twenty to forty micron fibers are the larger sized fibers that are not used for clothing. One source of fibers with these characteristics is the fleeces of English Down sheep. Sheep need to be sheared yearly and their fleeces have been considered a waste product due to the fiber's unsuitability for clothing.

The larger sized fibers are important in forming a batt that retains its shape. The fiber 101 has natural or manufactured crimps 102. Preferably, the crimps 102 are spaced at intervals 104 of between ¼ and 1/64 inches but can be closer together or farther apart. The crimps 102 of each fiber 101, when processed into an intermeshed sheet, interlace with the crimps 102 of other fibers 101 in a manner that contributes the capability of the finished baits to hold their form without requiring glue, latex, or other binders while still being stretchable and resiliently compressible.

Figure 2:
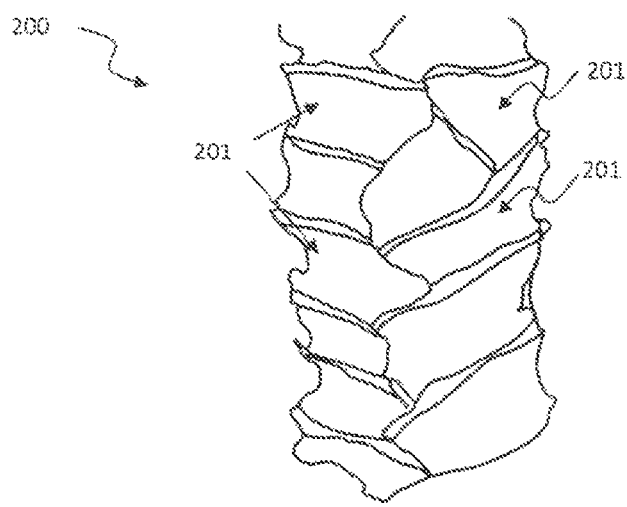
FIG. 2 is a close up side view of a segment of wool fiber showing the scales along the fiber.

FIG. 2 is a close-up view exemplar of a short segment of a natural wool fiber 200. The fibers have a desirable surface characteristic where the fiber is covered with scales 201. These scales make the wool unsuitable for clothing or fabrics in that the scales make the wool uncomfortable or itchy. These scales help keep the fibers in a batt from readily sliding over each other and thereby contribute to making the batt resiliently compressible. When the scales 201 of one fiber slide against another fiber, they will tend to hook or stick to the other fiber. Thus, as the batt expands, the scales 201 on the wool fibers help the batt retain its shape and resiliency.

Figure 3:
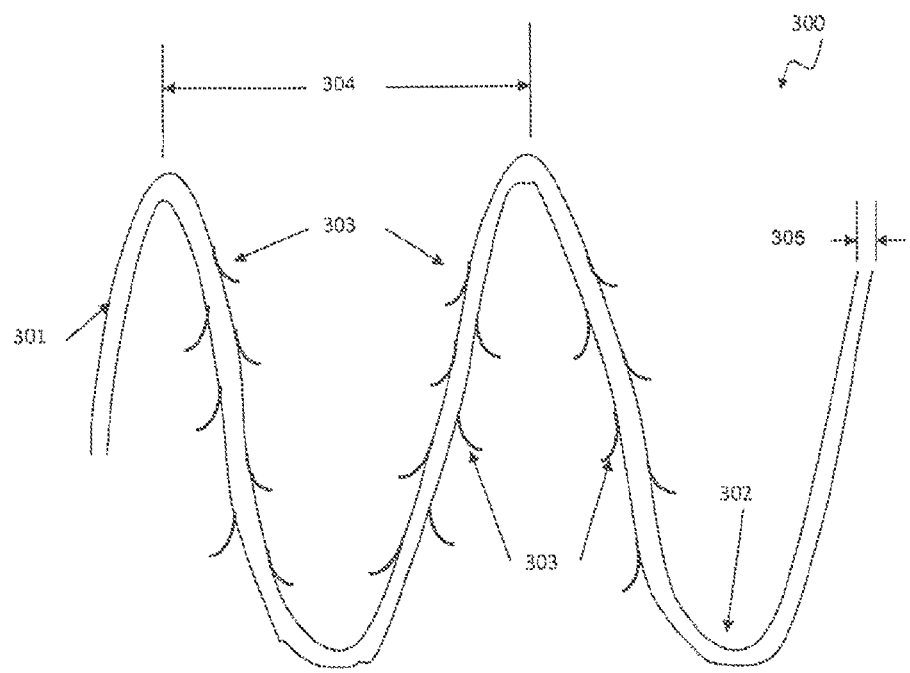
FIG. 3 is a side view of a synthetic fiber having crimps and hooks along the fiber filament for use in an insulation bait where the crimps and hooks provide support, structure, and an interlocking fiber mesh.

FIG. 3 is an exemplar example of a manufactured synthetic fiber 300 configured to impede one fiber from sliding over another fiber such that an insulation batt of intermeshed synthetic fibers 300 maintains its shape without the use of glues. The fiber 300 can be formed from plastic, polyesters, other chemical petroleum products, or mineral products such as glass or mineral fiber. The fiber 300 is comprised of a filament 301 having a diameter 305 and of material that is crimped into a serpentine shape. The crimps 302 can be formed during or after the formation of the filament 301. The crimps 302 can be formed by an extrusion process or mechanically formed into the filament 301 and can include the use of heat in forming the crimps 302. Preferably, the crimps 302 are spaced at intervals 304 of between 1/64 and ¼ inches but can be closer or farther apart. Along the filament 301, surface variations 303 on the filament 301 impede another fiber 301 within an insulation batt from moving or sliding over each other. The variation 303 can be cut, formed, glued, crimped, pressure fit, or melted, to the filament 301. The exemplar variation 303 as shown is a hook but other variations are contemplated. The variation can be, but is not limited to a ball, a bulge, a divot, a ring, a disk, or a combination thereof. The variations 303 can be placed in a plane along the filament 301 or can be spaced randomly around the circumference of the filament 301. The number of variations 303 is preferably is at least one per crimp 302 but more are contemplated. The surface variations 303 can be evenly or randomly located along the filament 301.

Figure 4:
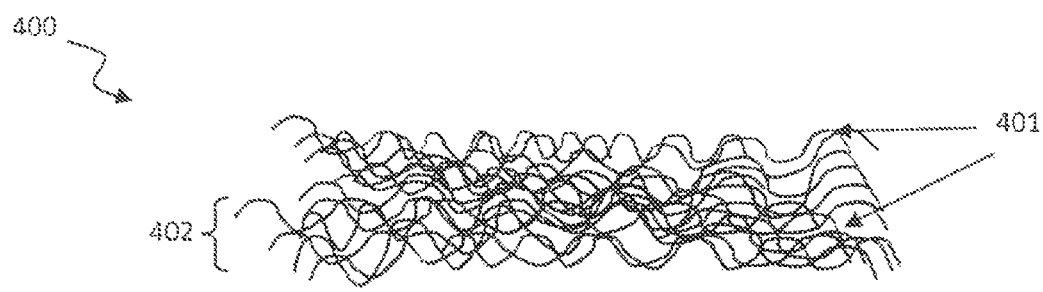
FIG. 4 shows and fiber sheet of intermeshed fibers forming a sheet batt.

FIG. 4 is exemplar of a single sheet 400 of intermeshed fibers used in manufacturing soft batt insulation. The ban 400 is comprised of fibers 401, natural or synthetic, that are processed into an intermeshed fiber sheet. A single sheet 400 can form an insulation batt but typically multiple intermeshed fiber sheets 400 are overlaid and rolled together to form a batt of insulation. A roller compresses the multiple sheets such that some of the fibers at the interface of the sheets interlock thus form an integral insulation batt. For wool fibers, carding and garnetting the wool form the fibers 401 into an intermeshed sheet of fibers having a thickness 402 of substantially uniform density. The sheet 400 is typically 1/16 inch to 1 inch thick but can be thicker or thinner.

The density of the insulation batt is selected to provide optimal insulation. For wool fiber insulation, if the batt density is too high, then the R-value or the insulation characteristics will be less than optimal. If the batt density is too low, then again the R-value or insulation characteristics will be less than optimal. The preferable batt density is 1 to 3.0 pounds per cubic foot. The batt density may also be between 3.0 and 5.25 pounds per cubic foot, depending on the desired R-value.

Thus for a batt that is approximately 3.5 inches, the batt density is between 1.0 and 1.5 pounds per square foot.

Another benefit of a wool insulation batt formed from intermeshed sheets of crimped and scaled fibers is its ability to naturally expand. For example, a wool insulation batt having a density of 1.3 pounds per square foot installed inside in a 3.5 inch wall space will provide a insulation value of R-13. The same wool insulation batt installed in an attic and lying unconstrained will expand to a greater thickness, providing an insulation value of R-19. This characteristic provides the unexpected result of an insulation batt providing differing insulation values depending on where and how it is installed and having multiple insulation uses. Though not optimal, the same insulation batt could expand to fit the walls of a building with 2"×4" construction, a building with 2"×6" construction, and the attic of both.

Figure 5:
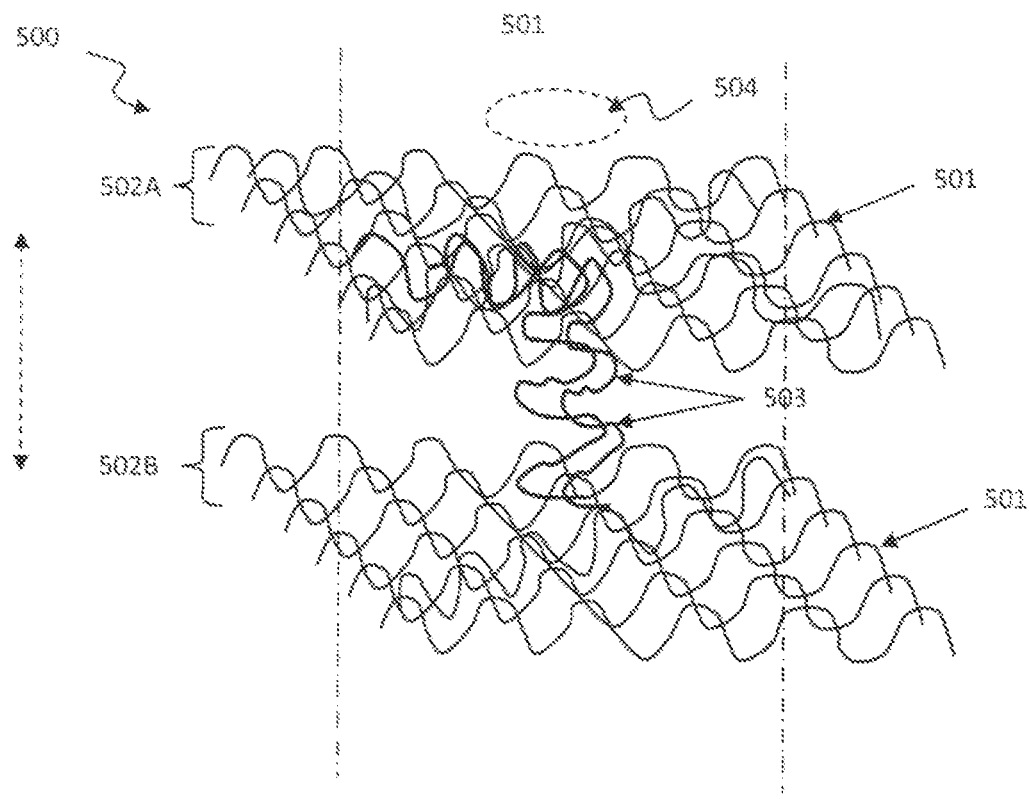
FIG. 5 shows an expanded view of a two-layer batt with fibers pushed through to provide a retention structure.

FIG. 5 is exemplar of an expanded view of an insulation batt 500 formed by a first sheet 502A and a second sheet 502B of intermeshed fibers. While two sheets 502A, 502B are shown, the insulation batt can contain more than two sheets. Each sheet 502A, 502B is formed from natural or synthetic fibers 501 having crimps, preferably English Down wool, formed into an intermeshed sheet. For the reasons mentioned above, fibers 501 having hooks, scales or other surface irregularities that impede fibers from sliding over the surface of another fiber are preferred. When the sheets are passed through rollers or otherwise compressed, fibers on the interface between the intermeshed fiber sheets will hook to or intermesh with the surface fibers of the adjacent sheet and thereby form an integral insulation batt.

In some embodiments, the batt 500 includes a batt restrainment structure. For one embodiment, a portion of the fibers 503 within an area 504 of the bait are pushed through one or more adjacent sheets of the batt 500. These fibers 503 interlock with the fibers 501 of one or more sheets thereby restraining the batt shape and thus limiting the batt expansion. The restrainment structure fibers 503 can be the same type of fibers as the batt fibers 501. A punch with hooks can be used to push a portion 503 of the fibers within an area 504 through the layers 502A, 502B. However, it is contemplated that other restrainment structures can be used including but not limited to threads comprised of different fibers, buttons, rivets, staples, and the use of glues and cements.

B. Fiber Treatment

Natural fibers include protein-based fibers such as wool and cellulous fiber such as cotton are treated before or after being formed into insulation baits. The fiber treatment modifies the fiber characteristics including its resistance to flames, fungus molds, and pests. The natural fibers can be given a surface treatment or a treatment where chemicals penetrates the fiber surface and are dispersed throughout the internal structure of the fiber. Surface treatments are applied as a spray or powder that adheres to the fiber surface. A binder can be provided before or with the treatment to improve the adherence of the treatment to the fibers. Another method for fiber surface treatment is to use a willowing machine to tumble the fibers with a treatment chemical. The tumbling helps bind the treatment to the surface of the fiber and evaporate any solvents used with the treatment chemical.

Figure 6:
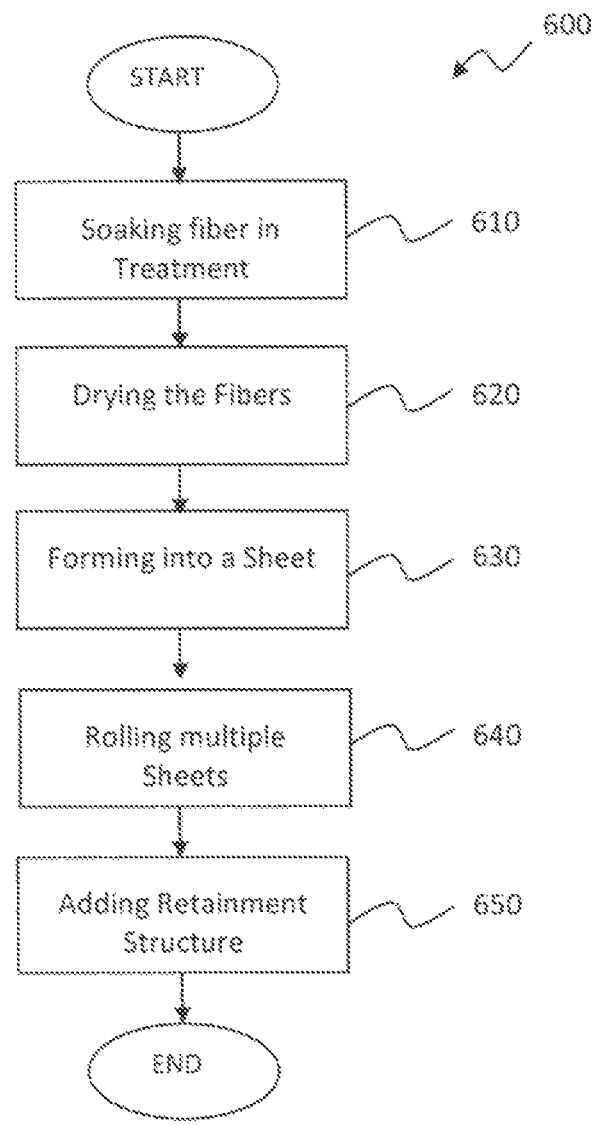
FIG. 6 shows a flow chart illustrating the steps of treating fibers with a solution and forming an insulation batt.

FIG. 6 is exemplar of one embodiment of a process 600 of manufacturing an insulation batt. In a step 610 the fibers are soaked in a treatment solution to improve the fibers resistance to flame, pests, fungus and molds. The fibers can be natural or synthetic. The natural fibers fall into two categories, protein-based fibers and cellulous-based fibers. Examples of protein-based fiber are hair including wool. Examples of cellulous-based fibers include cotton, and other plant fibers. Preferably the fibers are wool having a wool hair diameter of 20-40 microns, with crimps between 1/64 and 1/4 inches, and scales on the surface of the fiber. Preferably the fibers are prewashed and substantially free from oils and fat such as lanoline and contaminates that can cause odors. However, it is contemplated that the treatment could contain a chemical that would remove oils at the same time as treating the fiber for flame resistance, pest resistance, and fungus and mold resistance. It is also contemplated that the treatment could be a single step process of soaking, or can require soaking in multiple different treatment solutions.

Exemplar of chemicals used as flame retardants include but are not limited to: mono-ammonium phosphate (MAP), di-ammonium phosphate (DAP), poly-ammonium phosphate, mono-ammonium sulfate, di-ammonium sulfate, poly-ammonium sulfate, guanyl urea phosphate (GUP), guanyl urea phosphate or a combination of these chemicals. These chemicals can be combined with boric acid, Disodium Octaborate, boric acid with borates, or any combination of these chemicals.

Chemicals exemplar of pesticides includes but are not limited to pyrethroids including permethrin, cypermethrin, deltamethrin, bifenthrin, fipronil, imidacloprid, or any combination of these chemicals.

Exemplar of chemicals used as fungicides and mold resistance includes but are not limited to: tributyltin oxide, acypetacs-zinc, copper, iothiazolinones, quaternary ammonium compounds (such as didecyl dimethyl ammonium chloride (DDAC), azoles such as propiconazole, iodopropynyl-butyl-carbamate (IPBC), chlorothalanil, or any combination of these chemicals. Any of the above fungicide chemical or combination of the above fungicide chemicals can be combined with borate.

The borates, used with the flame retardants and fungicides, include but are not limited to any inorganic borate including boric oxide or boric acid, alkali earth, alkaline metal borates such as sodium borates (including disodium octaborate tetrahydrate (DOT) and sodium pentaborate (SPB), calcium or zinc borates or any combination thereof.

Some of the chemicals function as a flame retardant, insecticide, and fungicide treatment. Disodium octaborate tetrahydrate (DOT) and sodium pentaborate (SPB) are chemicals having these multiple properties.

Preferably, the fibers should be treated so that the dry weight of the treatment chemicals is 0.2% to 15% of the treated fiber weight. For wool fibers, the treatment solution preferably is heated to between 60 and 160 degrees Fahrenheit. The fibers should be soaked for between three seconds and twenty minutes.

In a step 620 the fibers are dried to remove any solvents used with the treatment. The solvents can include water or other chemicals that help the treatment chemical penetrate the surface of the fiber and reach the fiber's internal structure. The fibers can be dried using but not limited to air driers, sun dried, and tumble driers.

In a step 630, the fibers are formed into an intermeshed sheet of fibers having a substantially uniform density. The making of sheets of fibers can include the use of a carding machine, garnetting machine, or combination of these machines. The carding machine is used to separate tangled clumps of fiber. A garnetting process will form a sheet of intermeshed fibers. The scales on the wool fibers form a sheet of intermeshed fibers that is resiliently compressible. Current wool processing techniques produce a sheet of intermeshed fibers of up to an inch in thickness. However, it is contemplated that a processing technique can produce a sheet thick enough to be used as an insulation batt.

In an optional step 640, multiple sheets of fibers are overlaid and pressed together. A roller, a pair of rollers, or press can be used to compress the sheets. Some of the fibers on the interface between the fiber sheets will interlock with fibers in the adjacent sheet and thereby form an integral insulation batt. However, multiple intermeshed fiber sheets may need to be overlaid to obtain the desired batt thickness and density.

In an optional step 650, a restrainment structure is formed. The restrainment structure helps the batt to retain its shape. Without the restrainment structure, an insulation batt tends to expand beyond the desired thickness and thereby making the batt harder to store or install and change the batts fire resistance. Preferably the restrainment structure is formed by using a small rod or needle with a hook or appendage to catch and push fibers in one sheet of the batt through the other sheets of the batt. These fibers pushed through the batt, because of the crimps, scales, or fibers hooks, restrain the batt fibers from expanding by tending to hold the layers together. The restrainment structure is formed over one or more areas. The pattern can be a quilting pattern or any other regular or irregular pattern. Other restrainment structures are contemplated.

Further, the restrainment structure can be a natural or synthetic thread drawn and secured through the batt, a button, staple, wire, glue, cement, melted plastic, or any other mechanical structure that secures or tends to restrains one side of the batt to the other side of the batt. The restrainment structure can be used to control the batt density where the burning rate of the insulation batt needs to be controlled.

Figure 7:
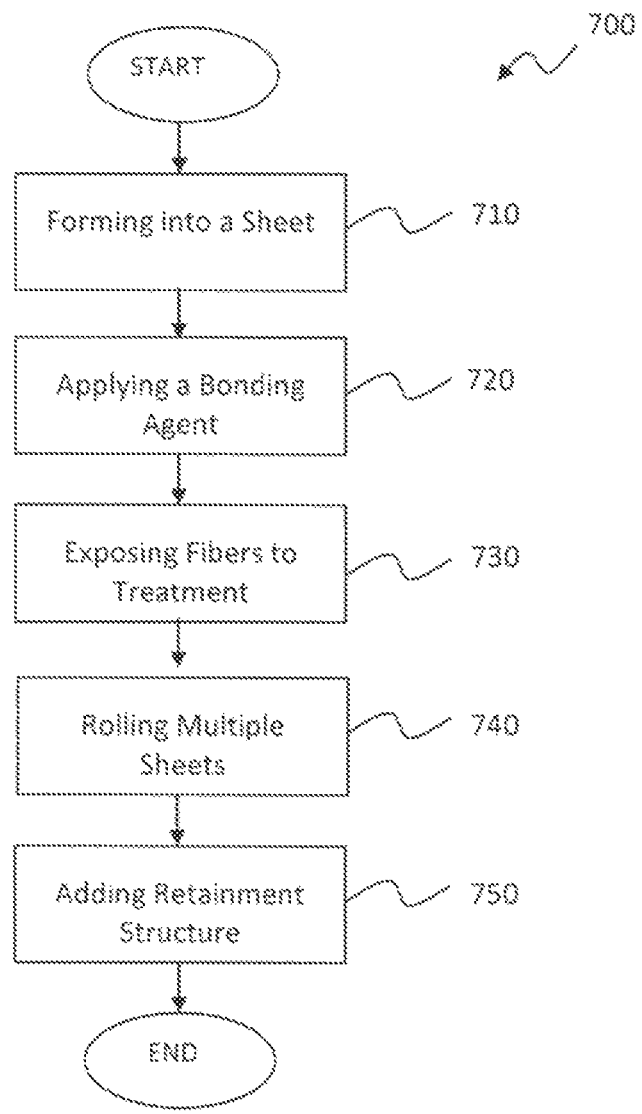
FIG. 7 shows a flow chart illustrating the steps of treating fiber surfaces with a powder and forming an insulation batt.

FIG. 7 is exemplar of another embodiment of the process of manufacturing an insulation batt. In a step 710 an intermeshed sheet of fibers is formed in the same manner described above for FIG. 6, step 630. The fibers can be natural or synthetic. Preferably the fibers are prewashed and substantially free from oils and fat such as lanoline.

In an optional step 720, a bonding agent is applied to the fibers. The bonding agent includes oil or other adhesives that adheres a treatment powder to the fibers. The binding agent can be applied by spraying or immersing the batt into a solution containing a binding agent.

In a step 730, the fibers are exposed to a treatment. The treatment can be a powder that is sprayed on the fibers or applied by tumbling the batt in a willowing machine to evenly disperse the treatment. The treatment binds to the surface of the fibers. The same treatment chemicals used in the previously mentioned step, FIG. 6 step 610, can be used for the enhancing the flame, pest, and resistance to fungus and mold.

In an optional step 740 multiple sheets of intermeshed fibers are overlaid in the same manner as the previously mentioned for FIG. 6 step 640. In another optional step 750 a restrainment structure is formed in the insulation batt structure in the same manner as previously mentioned for FIG. 6 step 650.

C. Example

In accordance of one embodiment of the present invention, the processing of a protein-based fiber to form insulation batt is described. Wool is washed to remove residual oils such as lanoline and other contaminates.

The wool is then soaked treatment solution that containing a fire retardant, fungicide, and pesticide. The solution contains urea phosphate combined with boric acid with tributyltin oxide and permethrin that is heated to a temperature of 120 degrees Fahrenheit. The wool is soaked for ten minutes so that the treatment solution penetrates the inner structure of the wool fibers. The fibers are removed from the treatment solution and dried using a combination of spin-drying and air blowers.

Next the wool is put through a garnetting process to form the wool into a substantially uniform sheet of intermeshed fibers with a desired density per square foot and thickness. The final insulation batt is to have a thickness that fits inside a wall, 3.5 inches and an insulation batt density of 1.0 to 1.5 pounds per square foot of insulation material. The resulting batt sheet is 0.5 inches thick. Seven of the batt sheets are overlaid to form a batt with the desired thickness of 3.5 inches and density of 1.0 to 1.5 pounds per square foot. The overlaid batt sheets are compress by running the seven layers of batt sheets between rollers which causes wool fibers at the interface between each of the batt sheets to interlock and thereby form an integral insulation batt.

Next the insulation batt is run through a needling machine where a series of needles punch though the layers of batt sheet. Due to the fiber crimps, the fibers that are pulled through the batt sheet layers will interlock with other fibers in other batt sheets. These fibers tend to limit the expansion of the insulation batt but still allow for some batt expansion into voids, provide for a snug fit once installed into a wall, and limit the airflows that would reduce the insulation value of the batt.

The batt is then cut into a bait width of between 14.5 and 15 inches or 25 inches, the proper width to fit between the studs in the wall. For the purposes of storage and transportation, the batt is rolled up. Because of the crimps in the wool fiber, the batt is highly compactable but when unrolled will expand back to the original thickness.

At installation time, the insulation batt is unrolled and cut to the length required by the wall or other area to be insulated. If recently unrolled, the ball will still be in a compacted state. However, the insulation batt can be installed and the wall closed up before the batt expands to its full thickness. Over a time period of days, the batt will expand to into the wall space to fill the voids.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made to the embodiments chosen for illustration without departing from the spirit and scope of the invention.

We claim:

1. A method of manufacturing a resiliently compactable insulation batt comprising the steps in the following order:
    soaking fibers in a solution of treatment chemicals comprising a flame retardant, pesticide, fungicide, or a combination thereof,
        wherein the fibers are soaked for more than three seconds at a solution temperature of 60 to 160 degrees F.,
        wherein when the fibers are dry, the fibers contains 0.2 to 15 percent by weight of the treatment chemicals,
        wherein the fibers are free of oils before treatment, and
        wherein the fibers have surface irregularities and/or crimps that impede the fibers from sliding over the other fibers;
    drying the fibers; and
    forming the fibers into a sheet of intermeshed fibers with substantially even density thereby forming a batt sheet;
    wherein the method does not add a binding agent to the fibers.

2. The method of claim 1, wherein the crimps are spaced between 1/64 and 1/4 inches, wherein the fibers are 20 to 40 microns across.

3. The method of claim 1, further comprising the steps of overlaying one or more batt sheets, and compressing the batt sheets together thereby forming an insulation batt of a density of 1.0 to 3.0 pounds per cubic foot.

4. The method of claim 1, further comprising the step of adding a batt restrainment structure, wherein the restrainment structure is selected from the group consisting of staples, rivets, threads, glues, cements, melted plastic, and a subset of the fibers passing through one or more of the batt sheets.

5. The method of claim 1, wherein the flame retardant is selected from the group consisting of mono-ammonium phosphate, di-ammonium phosphate, poly-ammonium phosphate, mono-ammonium sulfate, di-ammonium sulfate, poly-ammonium sulfate, guanyl urea phosphate, and a combination thereof.

6. The method of claim 5, wherein the solution further comprises a flame retardant selected from the group consisting of boric acid, disodium octaborate, boric acid with borates, and a combination thereof.

7. The method of claim 1, wherein the pesticide is a pyrethroid or a combination of pyrethroids.

8. The method of claim 7, wherein the pyrethroid is selected from the group consisting of permethrin, cypermethrin, deltamethrin, bifenthrin, fipronil, imidacloprid, and a combination thereof.

9. The method of claim 1, wherein the fungicide is selected from the group consisting of tributyltin oxide, acypetacs-zinc, copper, isothiazolinones, a quaternary ammonium compound, an azole, iodopropynyl-butylcarbamate (IPBC), chlorothalanil, and a combination thereof.

10. The method of claim 9, wherein the quaternary ammonium compound is didecyl dimethyl ammonium chloride (DDAC).

11. The method of claim 9, wherein the azole is propiconazole.

12. The method of claim 1, wherein drying the fibers includes air drying, sun drying, spin drying, or tumble drying.

13. The method of claim 1, wherein the method does not add glue or latex to the fibers.

14. The method of claim 1, wherein the fibers are natural fibers.

15. The method of claim 14, wherein the natural fibers are protein-based fibers or cellulose-based fibers.

16. The method of claim 15, wherein the protein-based fibers are wool.

17. The method of claim 15, wherein the fibers are protein-based fibers comprising crimps spaced between 1/64 and 1/4 inches, wherein the protein-based fibers are 20 to 40 microns across, and wherein the protein-based fibers have a length of one half inch to six inches.

18. The method of claim 15, wherein the cellulose-based fibers are cotton.

19. The method of claim 1, wherein the fibers are synthetic fibers.

20. The method of claim 19, wherein the synthetic fibers are fibers formed from plastics, polyesters, chemical petroleum based fibers, or fiberglass.

21. The method of claim 20, wherein the synthetic fibers are 20 to 40 microns across, and wherein the fibers have a length of one half inch to twelve inches.

\* \* \* \* \*